July 21, 1959 P. P. HUBER 2,896,167
INSTRUMENT BEARING ARRANGEMENT
Filed Oct. 19, 1956
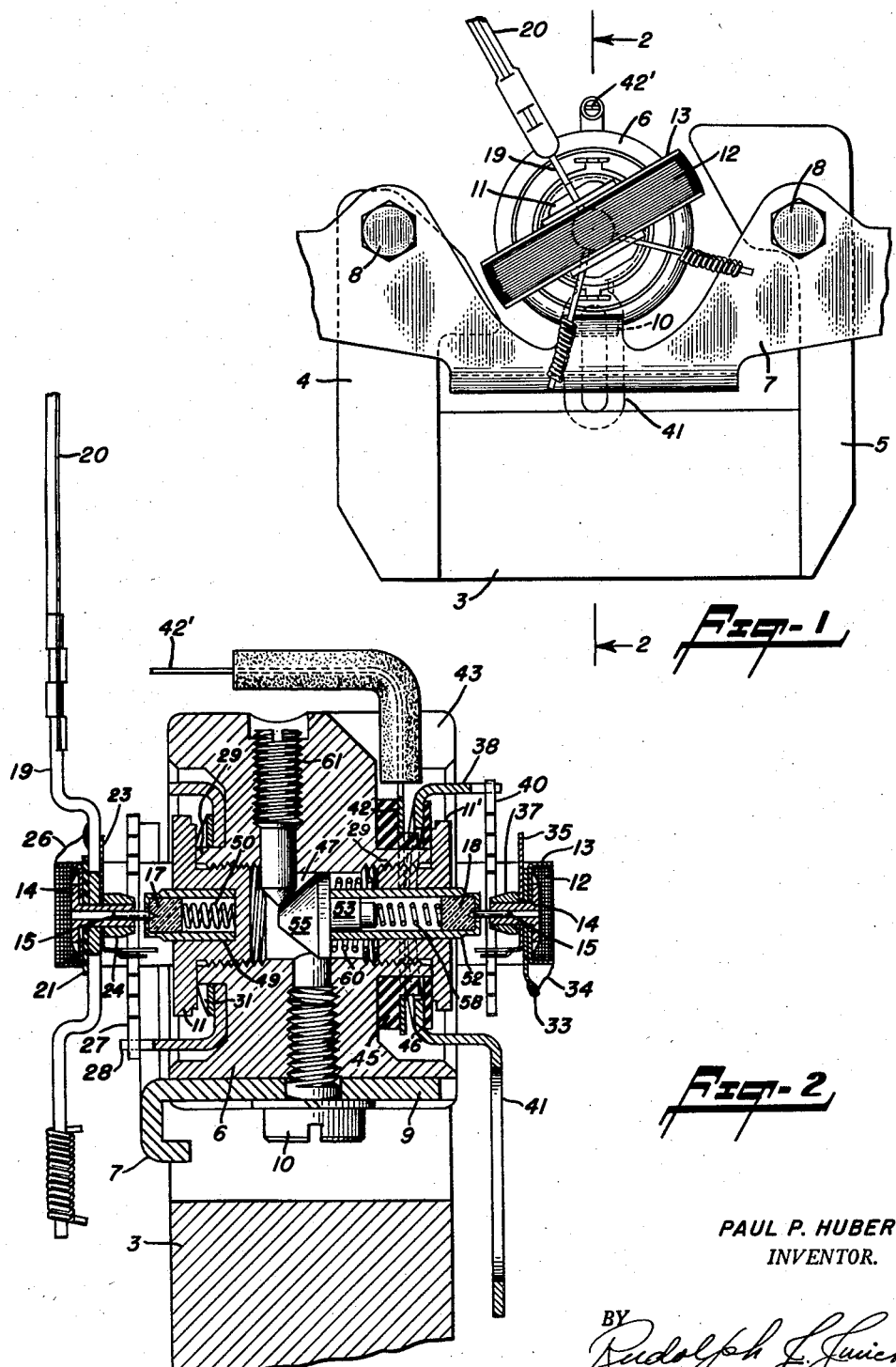
PAUL P. HUBER
INVENTOR.

United States Patent Office 2,896,167
Patented July 21, 1959

2,896,167

INSTRUMENT BEARING ARRANGEMENT

Paul P. Huber, Hillside, N.J., assignor, by mesne assignments, to Daystrom, Incorporated, Murray Hill, N.J., a corporation of New Jersey Application October 19, 1956, Serial No. 617,034

1 Claim. (Cl. 324—155)

This invention relates to electrical measuring instruments of the type wherein bearings for the moving coil are located within the coil and more particularly to resiliently mounted bearings for such instruments.

Electrical measuring and control instruments of the internal bearing type are well known and possess several advantageous features not found in the conventional external bearing instruments; one of which is that the thickness of the internal bearing type instrument may be made much less than that of the external bearing type instrument. An instrument of the internal bearing type is shown in United States Patent No. 2,463,770, entitled, Internal Pivot Electrical Measuring Instrument by Paul Huber and Alexander T. Williams issued March 8, 1949. My novel resiliently mounted bearings are particularly adapted for use in the internal bearing type instrument shown in the above-mentioned patent. Internal bearing instruments employing resiliently mounted bearings of the type anticipated by my invention are capable of withstanding extreme shocks and impacts without damage to the jewel bearings or pivot pins.

An object of this invention is the provision of an internal pivot electrical measuring instrument having resiliently mounted bearing elements.

An object of this invention is the provision of a rugged electrical measuring instrument of the internal bearing type which is capable of withstanding hard shocks.

An object of this invention is the provision of an internal pivot electrical measuring instrument in which the maximum pressure which may be exerted between the bearings and pivot pins is limited to a pressure less than that required to break or deform the same.

An object of this invention is the provision of a core and bearing assembly for an electrical measuring or relay instrument, said assembly comprising a substantially cylindrical core having an axial passage therethrough, bushings mounted in the opposite ends of said passage, a first sleeve carried by one of the said bushings, a resiliently biased bearing element supported within the said first sleeve, the other bushing having an axial bore therethrough, a second sleeve slidably mounted in the said axial bore, a sleeve plug snugly fitted in one end of the said second sleeve, a second resiliently biased bearing element supported within said second sleeve, spring means tending to withdraw the said second sleeve and sleeve plug into the core, and means adjustable to force the said second sleeve and sleeve plug outwardly.

These and other objects and advantages will become apparent from the following description when taken with the accompanying drawings. It will be understood the drawings are for purposes of illustration and are not to be construed as defining the scope or limits of the invention, reference being had for the latter purpose to the appended claim.

In the drawings wherein like reference characters denote like parts in the several views:

Figure 1 is a fragmentary top view of an internal pivot electrical instrument embodying my novel resiliently mounted bearings in the moving coil supporting system; and Figure 2 is, essentially, an enlarged longitudinal sectional view taken on line 2—2 of Figure 1.

Reference is now made to the drawings wherein the reference numeral 3 identifies a permanent magnet provided with attached pole pieces 4 and 5 all of which comprise a portion of a direct current measuring instrument or relay. A soft iron core 6 of approximately cylindrical form is supported in the gap between the pole pieces 4 and 5 by a bridge 7 of non-magnetic material. The bridge is clamped against the face of the pole pieces by screws 8 which extend through the bridge and into the insulating base of the instrument housing, which housing is not shown in the drawings. A depending tongue 9 of the bridge fits within a longitudinal slot in the core 6 and is apertured to pass the screw 10 which clamps the core to the bridge. Bushings 11 and 11', having hexagonal flanges, are threaded into the left and right threaded portions, respectively, of the core, as shown in Figure 2.

The moving system of the instrument or relay includes a coil 12 wound within a rectangular frame or form 13 which is centrally apertured at its opposite ends to pass the externally threaded bushings 14 in which pivot pins 15 are mounted. The pivot pins are seated on spring-biased bearing elements 17 and 18, the novel mountings for which are described in detail below.

The coil form 13 adjacent the left bushing 14, as shown in Figure 2, is insulated from the central apertured section of a pointer support 19 by means of an insulating disk 21. A pointer 20 is suitably attached to the pointer support 19. An inner spring abutment 23 is seated against the other side of the pointer support 19, and the assembly is clamped to the coil form 13 by a nut 24 which is threaded upon the bushing 14. One coil terminal 26 of the coil 12 is soldered, or otherwise suitably connected electrically, to the pointer support 19. A spiral spring 27, which also serves as a lead for grounding the one coil terminal 26 on the bridge 7, has its opposite ends secured to the inner spring abutment 23 and an outer spring abutment 28 which has a central apertured section fitted over the left cylindrical section 29 of the core 6, as shown in Figure 2, and which is held in good electrical contact with the core 6 by a spring washer 31 which lies between the spring abutment 28 and the flanged head of the left bushing 11.

A terminal washer 33 which is electrically connected to the other coil terminal 34, and an inner spring abutment 35 are mounted within the right end of the coil form 13, as shown in Figure 2, by a nut 37 which is threaded upon the right pivot bushing 14. The outer abutment 38 for a spiral spring 40 is a domed, resilient washer having a slotted extension 41 for receiving an eccentrically located pin of a zero adjuster not shown in the drawing, but well understood by those skilled in this art. A terminal washer 42 overlies the spring abutment 38 and has an integral tongue 42' which extends through a slot 43 in the outer face of the core 6 to terminate at a point convenient to solder a lead to the tongue. The spring abutment 38 contacts the washer 42 to complete the circuit to the right coil terminal and the spring abutment and washer are insulated from the core by insulating disks 45 and 46.

The soft iron core 6 is provided with an axially extending passage, the central portion 47 being cylindrical and the ends being enlarged and threaded. The ends of the core 6 are countersunk with annular recesses and the cylindrical, internally threaded portions 29 of the core are cut back from the end faces of the core. The bushing 11 is threaded into the left threaded portion 29 of the core, as seen in Figure 2; the bushing having a hexagonal flange which seats against the left end of the cylindrical portion. A sleeve 49 snugly fits the hole in the bushing 11 and houses the jewel bearing 17. A spring 50 within the sleeve biases the jewel bearing 17 outwardly toward suitable end abutment or stop portions of the sleeve 49.

The bushing 11' which has a central bore is threaded into the right cylindrical portion 29, as shown in Figure 2, and has a hexagonal flange seating against its right end. The jewel bearing 18 is slidably positioned in a sleeve 52 slidably mounted in the bore in the bushing 11" and which is provided with a snugly fitting sleeve plug 53. A spring 58 within the sleeve 52 abuts the sleeve plug 53 at one end and the jewel bearing 18 at the other end and biases the bearing 18 to the right toward suitable end abutment or stop portions of said sleeve 52 as shown in Figure 2. The sleeve plug 53 has an enlarged head 55 of conical form which slidably fits the central section 47 of the axial passage through the core 6. A coiled spring 60 surrounds the sleeve 52 and tends to withdraw the sleeve plug 53 and attached sleeve 52 into the core along with the spring biased jewel bearing 18. A screw 61 is threaded into the core 6 from its outer side and has a conical end contacting the conical head 55 of the sleeve plug 53 to, upon turning one way, force the sleeve 52 and sleeve plug outwardly, and upon turning the other way, allow said parts to be moved inwardly by the spring 60.

The method of assembly of the coil on its bearings will be apparent from the following description. The jewel bearing 17 is inserted from the inner end of the sleeve 49, the spring 50 inserted thereafter and the sleeve pushed into place in its bushing 11. The jewel bearing 18 is inserted from the inner end of the sleeve 52, the spring 58 inserted thereafter and the sleeve is then pushed into place on its plug 53. The sleeve 52 and jewel bearing 18 are retracted by the spring 60 when the adjusting screw 61 is backed off, and the coil 12 is placed in position with its left-hand pivot 15 seated on the jewel 17, as seen in Figure 2. The screw 61 is then turned inwardly to force the sleeve plug 53 and sleeve 52 outwardly to seat the right-hand pivot 15 on its jewel bearing 18, as shown in Figure 2. The assembly of the instrument does not present any unusual problems and, in general, the moving system with spring biased internal bearings can be assembled on a commercial scale with at least the same facility and efficiency as the prior moving systems with external, spring biased bearings.

Internal pivot electrical measuring instruments constructed with the resiliently mounted jewel bearings of my invention are capable of withstanding severe shocks and blows with no damage to the pivot pins and bearings. The springs 50 and 58 behind the bearings 17 and 18, respectively, absorb much of the force of shocks which result from mishaps such as dropping the instrument. If, for example, an impact causes the moving system of the instrument to be moved to the right with respect to the core 6, the spring 50 will be compressed by action of the right-hand movement of the left pivot pin 15 on the bearing 17, as seen in Figure 2. If the impact is severe enough, the right-hand surface of left bushing 14 will seat upon the left-hand surface of the sleeve 49 thereby limiting the total distance that the pivot pin 15 may move the bearing 17 against the action of the spring 50 thus preventing an excess force from developing between the left pivot pin 15 and bearing 17 which force would deform or break the same. It will be understood that if the impact is in the opposite direction such that the moving system is moved to the left with respect to the core 6, the right pivot pin 15 will force the jewel bearing 18 to the left compressing the spring 58. The total relative movement in this direction is limited to the point where the right bushing 14 abuts the sleeve 52. It is seen that a truly rugged instrument of the internal pivot type which is easily assembled may be constructed with the resiliently mounted bearing apparatus of my invention.

Having now described my invention in detail in accordance with the patent statutes, various changes and modifications will suggest themselves to those skilled in this art, and it is intended that such changes and modifications shall fall within the spirit and scope of the invention as recited in the following claim.

I claim:

A core and bearing assembly for an electrical instrument, said assembly comprising a substantially cylindrical core having an axial passage therethrough; a pair of bushings individually mounted in the opposite ends of the said passage; a first sleeve fixedly carried by one of the said bushings, said sleeve having jewel bearing abutment portions at its outer end and open at its inner end; a jewel bearing movably supported within said first sleeve; a spring carried in said sleeve and acting between said bushing and the adjacent end of said bearing to urge said bearing toward said abutment portions; a second sleeve slidably mounted in a bore extending axially through the other bushing, said second sleeve having jewel bearing abutment portions at its outer end and open at its inner end; a jewel bearing movably supported within said second sleeve; a second spring carried in said second sleeve; a plug having a conical head external of the second sleeve and a reduced-diameter shank force-fitted into the inner end of the sleeve and forming an inner abutment for said second spring to enable it to push outwardly on the jewel bearing supported within said second sleeve; spring means tending to withdraw the said second sleeve and attached plug into the core; and means co-acting with the conical head of the plug and adjustable to force the said second sleeve and attached plug outwardly.

References Cited in the file of this patent

UNITED STATES PATENTS

| 2,463,770 | Huber | Mar. 8, 1949 |

FOREIGN PATENTS

| 485,611 | Germany | Nov. 2, 1929 |
| 809,112 | Germany | July 23, 1951 |